(12) United States Patent
Hamad et al.

(10) Patent No.: US 11,719,200 B2
(45) Date of Patent: Aug. 8, 2023

(54) SEPARATING A FUEL ON-BOARD A VEHICLE

(71) Applicant: Saudi Arabian Oil Company, Dhahran (SA)

(72) Inventors: Esam Z. Hamad, Dhahran (SA); Ahmad A. Khan, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/154,222

(22) Filed: Jan. 21, 2021

(65) Prior Publication Data

US 2021/0172407 A1 Jun. 10, 2021

Related U.S. Application Data

(62) Division of application No. 15/445,257, filed on Feb. 28, 2017, now Pat. No. 10,927,799.

(51) Int. Cl.
*F02M 33/00* (2006.01)
*F02M 31/02* (2019.01)
(Continued)

(52) U.S. Cl.
CPC .............. *F02M 33/00* (2013.01); *B01D 3/06* (2013.01); *B01D 3/32* (2013.01); *B01D 3/40* (2013.01);
(Continued)

(58) Field of Classification Search
CPC . B01D 15/08; B01D 3/06; B01D 3/32; B01D 3/40; B01D 3/42; B01D 61/00;
(Continued)

(56) References Cited

U.S. PATENT DOCUMENTS 5,225,072 A 7/1993 Vidueira
6,332,448 B1 12/2001 Iiyama et al.
(Continued)

FOREIGN PATENT DOCUMENTS

CN 101037981 9/2007
CN 101289062 10/2008
(Continued)

OTHER PUBLICATIONS

Machine Translation of CN 110191940 A PDF file name: "CN110191940A_Machine_Translation.pdf".*
(Continued)

*Primary Examiner* — Grant Moubry
*Assistant Examiner* — Ruben Picon-Feliciano
(74) *Attorney, Agent, or Firm* — Fish & Richardson P.C.

(57) ABSTRACT

In an aspect, a system includes a mixer configured to mix a fuel stream with a solvent to form a mixed stream, the solvent having a higher affinity for a second component of the fuel stream than for a first component of the fuel stream. The system includes a first separator configured to separate the mixed stream into (i) a first fuel fraction including the first component of the fuel stream and (ii) a mixed fraction including the second component of the fuel stream based on a difference in volatility of the first fuel fraction and the mixed fraction. The system includes a second separator configured to separate the mixed fraction into a second fuel fraction including the second component of the fuel stream and a solvent fraction.

14 Claims, 6 Drawing Sheets

(51) Int. Cl.
  *B01D 3/06* (2006.01)
  *B01D 3/40* (2006.01)
  *B01D 3/42* (2006.01)
  *B01D 3/32* (2006.01)
  *B01D 61/00* (2006.01)
  *B01D 15/08* (2006.01)
  *B01D 65/00* (2006.01)
  *C10G 7/08* (2006.01)
  *F02D 19/08* (2006.01)
  *F02D 41/00* (2006.01)
  *F02D 19/06* (2006.01)
  *C10L 1/06* (2006.01)

(52) U.S. Cl.
  CPC .............. *B01D 3/42* (2013.01); *B01D 15/08* (2013.01); *B01D 61/00* (2013.01); *B01D 65/00* (2013.01); *C10G 7/08* (2013.01); *C10L 1/06* (2013.01); *F02D 19/0649* (2013.01); *F02D 19/0671* (2013.01); *F02D 19/081* (2013.01); *F02D 41/0025* (2013.01); *F02M 31/02* (2013.01); *C10G 2300/4068* (2013.01); *F02D 2200/0611* (2013.01); *Y02T 10/12* (2013.01); *Y02T 10/30* (2013.01)

(58) Field of Classification Search
  CPC .. B01D 65/00; C10G 2300/4068; C10G 7/08; C10L 1/06; F02D 19/0649; F02D 19/0671; F02D 19/081; F02D 2200/0611; F02D 41/0025; F02M 31/02; F02M 33/00; Y02T 10/12; Y02T 10/30
  See application file for complete search history.

(56) References Cited

U.S. PATENT DOCUMENTS

| | | |
|---|---|---|
| 8,015,951 B2 | 9/2011 | Dearth et al. |
| 8,211,300 B2 | 7/2012 | Partridge et al. |
| 8,459,238 B2 | 6/2013 | Pursifull et al. |
| 8,580,111 B2 | 11/2013 | Patridge et al. |
| 8,656,869 B2 | 2/2014 | Leone et al. |
| 2007/0028861 A1* | 2/2007 | Kamio ............... F02M 25/0224 123/25 A |
| 2007/0215072 A1* | 9/2007 | Dearth ................ F02D 19/0665 123/25 A |
| 2008/0289599 A1 | 11/2008 | Kurotani et al. |
| 2009/0157277 A1* | 6/2009 | Pursifull .............. F02M 25/089 701/102 |
| 2012/0132576 A1 | 5/2012 | Partridge et al. |

FOREIGN PATENT DOCUMENTS

| | | | |
|---|---|---|---|
| CN | 110191940 A | * 8/2019 | ............ B01D 3/143 |
| EP | 1057988 | 12/2000 | |
| GB | 1301887 | 1/1973 | |
| JP | S4937341 | 10/1974 | |
| JP | 2001050070 | 2/2001 | |
| WO | 2017172057 | 10/2017 | |

OTHER PUBLICATIONS

JP Office Action issued in Japanese Appln. No. 2019547126, dated Nov. 16, 2021, 11 pages (With English Translation).
CN Office Action issued in Chinese Application No. 201880019905.X, dated Apr. 30, 2021, 31 pages (With English Translation).
GCC Examination Report issued in Gulf Cooperation Council Appln. No. GC2018-34869, dated Sep. 17, 2019, 3 pages.
PCT International Search Report issued in International Appln. No. PCT/US2018/019004, dated May 11, 2018, 15 pages.
KR Office Action in Korean Appln. No. 10-2019-7028621, dated Aug. 30, 2022, 14 pages, with English Translation.

* cited by examiner

SEPARATING A FUEL ON-BOARD A VEHICLE

CROSS-REFERENCE TO RELATED APPLICATIONS

This application is a divisional of and claims the benefit of U.S. application Ser. No. 15/445,257 filed on Feb. 28, 2017, the entire contents of which are incorporated by reference in its entirety.

BACKGROUND

Vehicles, such as cars, trucks, boats, all-terrain vehicles, and otherwise, typically use internal combustion engines for power. These engines consume fuel, such as gasoline, diesel, or another type of fuel, during operation. The fuel can be characterized by an auto-ignition characteristic value, such as an octane or cetane number.

SUMMARY

In an aspect, a system includes a mixer configured to mix a fuel stream with a solvent to form a mixed stream, the solvent having a higher affinity for a second component of the fuel stream than for a first component of the fuel stream. The system includes a first separator configured to separate the mixed stream into (i) a first fuel fraction including the first component of the fuel stream and (ii) a mixed fraction including the second component of the fuel stream based on a difference in volatility of the first fuel fraction and the mixed fraction. The system includes a second separator configured to separate the mixed fraction into a second fuel fraction including the second component of the fuel stream and a solvent fraction.

Embodiments can have one or more of the following features.

The first fuel fraction has a different auto-ignition characteristic value than the second fuel fraction.

The mixer is configured to mix the fuel stream with at least a portion of the solvent fraction from the second separator.

The system includes a first heater configured to heat the mixed stream. The first separator is configured to separate the heated mixed stream. The first heater includes a heat exchanger configured to heat the mixed stream by exchange with the first fuel fraction from the first separator.

The system includes a second heater configured to heat the mixed fraction. The second separator is configured to separate the heated mixed fraction. The second heater includes a heat exchanger configured to heat the mixed fraction by exchange with the second fuel fraction from the second separator.

The first separator includes a flash distillation separator.

The second separator includes one or more of a flash tank, a membrane, and an adsorption unit.

The system includes a controller configured to control one or more of the first separator and the second separator based on an operating characteristic of an engine of a vehicle. The operating characteristic of the engine includes one or more of an engine load, an engine torque, and engine speed, a fuel vapor-liquid ratio, a fuel vapor lock index, a fuel drivability index, a fuel T90 or T95 property, a fuel lubricity, a fuel viscosity, and an engine speed-torque ratio. The controller is configured to control one or more of the first separator and the second separator to provide fuel with a target auto-ignition characteristic value to the engine. The controller is configured to control one or more of a temperature and a pressure of the first separator, the second separator, or both. The system includes an orifice fluidically coupled between the mixer and the first separator. The controller is configured to control the orifice based on the operating characteristic of the engine to vary a volumetric flow rate of the mixed stream.

The system includes a first fuel tank coupled to the first separator and configured to store the first fuel fraction; and a second fuel tank coupled to the second separator and configured to store the second fuel fraction.

In an aspect, a method includes mixing a fuel stream with a solvent to form a mixed stream, the solvent having a higher affinity for a second component of the fuel stream than for a first component of the fuel stream; separating the mixed stream into (i) a first fuel fraction including the first component of the fuel stream and (ii) a mixed fraction including the second component of the fuel stream based on a difference in volatility of the first fuel fraction and the mixed fraction; and separating the mixed fraction into a second fuel fraction including the second component of the fuel stream and a solvent fraction.

Embodiments can have one or more of the following features.

The first fuel fraction has a different auto-ignition characteristic value than the second fuel fraction.

Mixing the fuel stream with a solvent includes mixing the fuel stream with the solvent fraction.

The method includes separating the mixed stream on-board a vehicle during operation of the vehicle.

The method includes heating the mixed stream. Separating the mixed stream includes separating the heated mixed stream. Heating the mixed stream includes heating the mixed stream by exchange with the first fuel fraction.

The method includes heating the mixed fraction. Separating the mixed fraction includes separating the heated mixed fraction. Heating the mixed fraction includes heating the mixed fraction by exchange with the second fuel fraction.

The method includes controlling the separating of one or more of the mixed stream and the mixed fraction based on an operating characteristic of an engine of a vehicle. The operating characteristic of the engine includes one or more of an engine load, an engine torque, and engine speed, a fuel vapor-liquid ratio, a fuel vapor lock index, a fuel drivability index, a fuel T90 or T95 property, a fuel lubricity, a fuel viscosity, and an engine speed-torque ratio. Controlling the separating of one or more of the mixed stream and the mixed fraction includes controlling the separating to provide fuel with a target auto-ignition characteristic value to the engine. Controlling the separating of one or more of the mixed stream and the mixed fraction includes controlling a flow rate of one or more of the mixed stream and the mixed fraction. Controlling the separating of one or more of the mixed stream and the mixed fraction includes controlling a temperature or a pressure of the separating.

The method includes storing one or more of the first fuel fraction and the second fuel fraction in a corresponding fuel tank housed on a vehicle.

The method includes providing one or more of the first fuel fraction and the second fuel fraction to an engine of a vehicle.

The method includes storing one or more of the first fuel fraction and the second fuel fraction in a separation tank.

The on-board fuel separation system described here can have one or more of the following advantages. Use of the on-board fuel separation system can reduce fuel consumption, fuel cost, and carbon dioxide emission from vehicles and can enhance the efficiency of the engine by providing fuel that is well matched to the operating characteristics of the engine of the vehicle. For instance, implementations may supply the engine with a fuel of a particular optimized auto-ignition characteristic value based on engine load or operating conditions. The on-board fuel separation system can allow a vehicle driver to purchase a fuel with a low auto-ignition characteristic, which is typically less expensive than a fuel with a high auto-ignition characteristic, while still allowing the vehicle to use both the purchase fuel and a separated, higher value fraction of that fuel. The use of the on-board fuel separation system can decrease the demand for high octane fuels, thus encouraging increased production of lower octane fuels, which are less complex to process and generally result in lower greenhouse gas emissions. The on-board fuel separation system enables separation of a fuel stream into multiple fractions without requiring additional energy for the separation process.

DETAILED DESCRIPTION

We describe here a fuel separation system that can be mounted on-board a vehicle with an internal combustion engine, such as a car, truck, boat, or other vehicle that utilizes an engine to generate motive power. The on-board fuel separation system can separate a fuel stream into two or more individual fraction streams based on a characteristic of the fuel stream, such as an auto-ignition characteristic value, such as a Research Octane Number (RON) or cetane number. To separate the fuel stream, a solvent is added to the fuel stream. The solvent has an affinity for certain components of the fuel stream, and causes the volatility of those components to be changed relative to the volatility of the remaining components in the fuel stream. An extractive distillation process can then be used to separate the components into multiple fuel fractions. The solvent can then be removed from the fuel fraction to which it has an affinity and returned to the on-board fuel separation system for reuse.

Figure 1:
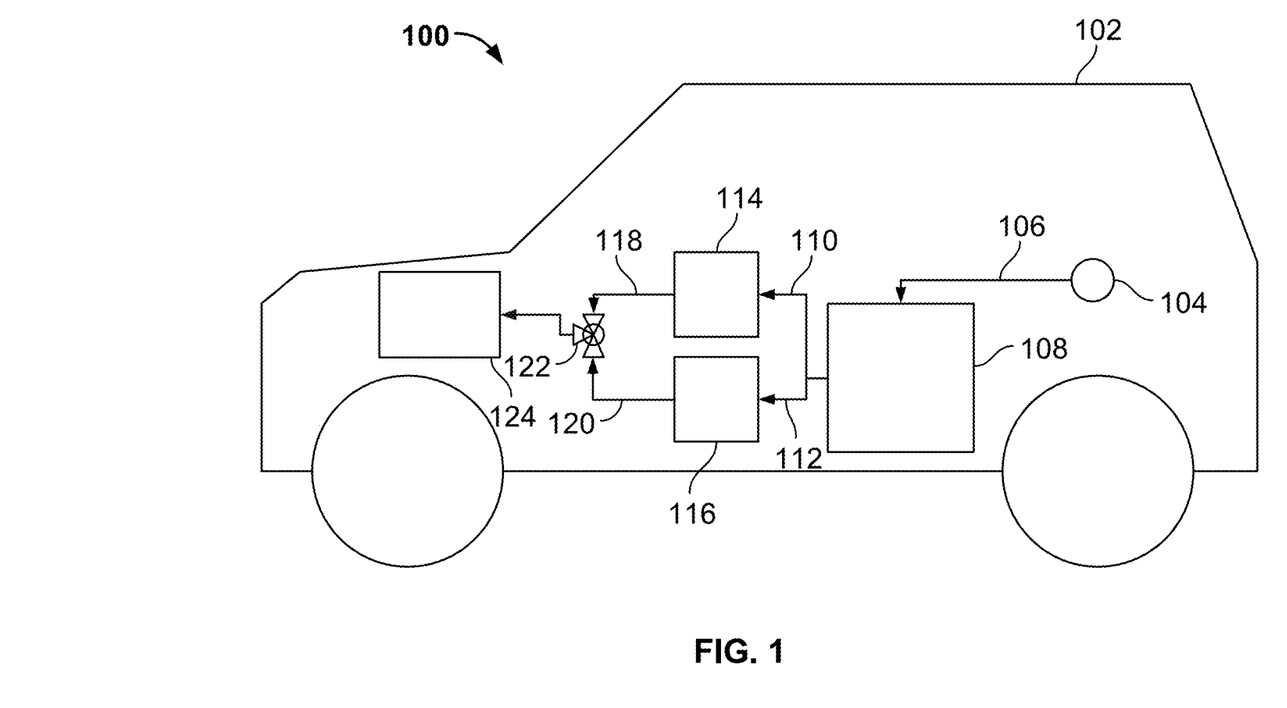
FIG. 1 is a diagram of a vehicle including an on-board fuel separation system.

Referring to FIG. 1, a vehicle system 100 includes an on-board fuel separation system 108 mounted on a vehicle 102. In the example of FIG. 1, the vehicle 102 is depicted as an automobile; however, the vehicle 102 can include an automobile, a motorized cycle, an all-terrain vehicle (ATV), a nautical vehicle (for example, a boat or another type of nautical vehicle), or an airborne vehicle (for example, a plane, an ultralight, or a drone or another type of airborne vehicle), whether manned or unmanned. More generally, the term "vehicle" as used here refers to any apparatus that derives powered movement from a hydrocarbon liquid fuel, such as gasoline, naphtha, diesel, or another such fuel. A vehicle can be any apparatus that includes an engine designed to use a fuel having an auto-ignition characteristic value, such as a research octane number (RON, sometimes also referred to as an octane rating) in the case of gasoline fuels or a cetane number in the case of diesel fuels.

The vehicle 102 includes a fuel input 104 that is fluidically coupled to the on-board fuel separation system 108, thus providing a fuel stream 106 to the separation system 108, for instance, during operation of the vehicle 102. The fuel in the fuel stream 106 can be, for instance, gasoline (for example, 91 RON gasoline, 95 RON gasoline, or gasoline with another RON), light straight-run naphtha (LSRN), diesel, or another type of fuel for an internal combustion engine. In some examples, a fuel tank (not shown) is fluidically coupled between the fuel input 104 and the on-board fuel separation system 108, for example, to contain a particular volume of fuel. In some examples, the fuel stream 106 can be variably circulated (for example, pumped) from the fuel tank to the on-board fuel separation system 108, for instance, as appropriate for operation of the vehicle 102. In some examples, a fuel rail of the vehicle 102 can be used for circulation of the fuel stream 106.

The on-board fuel separation system 108 separates the fuel stream 106 into two or more individual fraction streams based on, for example, a particular characteristic of the fuel stream. In some examples, the fuel stream 106 can be separated into fractions each having a different auto-ignition characteristic value (for example, RON, cetane number, or another value). In some examples, the fuel stream 106 can be separated into an aromatic fraction, an oxygenate fraction, or a fraction with another characteristic.

The on-board fuel separation system can include one or more separation units, such as flash distillation separators (for instance, flash tanks, distillation columns, compact distillation units, or other types of distillation separators), that can separate the fuel stream 106 into the multiple fractions. In some examples, the separation units can be operated at multiple pressures, multiple temperatures, or both, to achieve a desired separation characteristic, a particular flow rate of the separated fractions, a characteristic of the separated fractions, or another outcome.

In the example of FIG. 1, multiple fuel fraction conduits 110, 112 fluidically couple the on-board fuel separation system 108 to fractional fuel tanks 114, 116, respectively. For instance, the fuel fraction conduit 110 can fluidically couple the on-board fuel separation system 108 to the fractional fuel tank 114 to store a fuel fraction output by the onboard fuel separation system 108 that has a particular auto-ignition characteristic value, while the fuel fraction conduit 112 can fluidically couple the on-board fuel separation system 108 to the fractional fuel tank 116 to store another fuel fraction output by the on-board fuel separation system 108 that has a different auto-ignition characteristic value. In a specific example, the fractional fuel tank 114 can store a fuel fraction output by the on-board fuel separation system 108 that has a higher RON or cetane number than another fuel fraction output by the on-board fuel separation system 108 and stored in the fractional fuel tank 116. In some examples, more than two fractional fuel tanks can be fluidically coupled to the on-board fuel separation system 108, for instance, depending on the number of separation stages of the on-board fuel separation system 108.

In the example of FIG. 1, the fractional fuel tanks 114, 116 are fluidically coupled to an engine 124 (for example, an internal combustion gasoline, naphtha, or diesel engine) through fractional fuel supply lines 118 and 120 and a control valve 122. For example, the fractional fuel tank 114 (for example, which stores a higher RON fuel fraction) is fluidically coupled to the engine 124 through the supply line 118, while the fractional fuel tank 116 (for example, which stores a lower RON fuel fraction) is fluidically coupled to the engine 124 through the supply line 120. Based on, for example, dynamic (for example, instantaneous or real-time) driving conditions, such as speed vs. torque conditions, the control valve 122 can be controlled (for example, by a vehicle control system, not shown) to supply a particular fuel fraction stored in one of the fractional fuel tanks 114, 116 to the engine 124. The supplied fuel fraction can have an auto-ignition characteristic value (for example, RON or cetane number) optimized for the dynamic (for example, instantaneous or real-time) driving conditions. For example, a higher RON fuel fraction (for example, stored in tank 114) can be circulated to the engine 124 in response to one or more of high load engine conditions and high speed engine conditions. A lower RON fuel fraction (for example, stored in tank 116) can be circulated to the engine 124 in response to one or more of low load engine conditions and low speed engine conditions.

In some examples, fuel streams 118 and 120 from the fractional fuel tanks 114, 116, respectively, can each be fed to the engine 124. In some examples, the fuel streams 118, 120 can be mixed and the mixed fuel can be injected directly into the engine 124. In some examples, the fuel streams 118, 120 can each be injected directly to the engine 124. In some examples, one fuel stream (for instance, fuel stream 118) can be port-injected and the other fuel stream (for instance, fuel stream 120) can be directly injected into the cylinders of the engine 124. Direct injection of fuel streams into the engine can help avoid time lag in providing the correct fuel to the engine 124, as a time lag could result from the fuel already in the fuel line after a valve 122. In some aspects, the fuel route for the fuel streams 118 and 120 is kept as short as possible.

The on-board fuel separation system 108 described here can help reduce one or more of fuel consumption, cost, and $CO_2$ emissions. For example, depending on engine operating requirements (for example, dynamic or in real-time), a fuel fraction that has minimum appropriate auto-ignition characteristic value (for example, RON or cetane value) can be supplied to the engine 124. For instance, the on-board fuel separation system 108 can store a relatively high RON fuel fraction (for example, in fractional fuel tank 114) for the high load and high speed operating conditions; and a relatively low RON fuel fraction (for example, in fractional fuel tank 116) for low load and low speed operating conditions.

In some examples, one or both of the fractional fuel tanks 114 and 116 can be eliminated from the system 100, and, thus, one of the fuel fractions (for example, a higher RON fraction or lower RON fraction) can be circulated in real-time (for example, during operation of the engine 124 to power the vehicle 102) from the on-board fuel separation system 108 to the engine 124 as dictated by the engine operating conditions (for example, speed vs. torque, engine map operating point, or otherwise). In these examples, the only fuel storage tank on the vehicle 102 can be fluidically coupled between the fuel input 104 and the on-board fuel separation system 108 (for example, a standard vehicle fuel tank). In this configuration, the on-board fuel separation system 108 can be integrated into a conventional vehicle 102 that includes a single fuel tank.

Figure 2A:
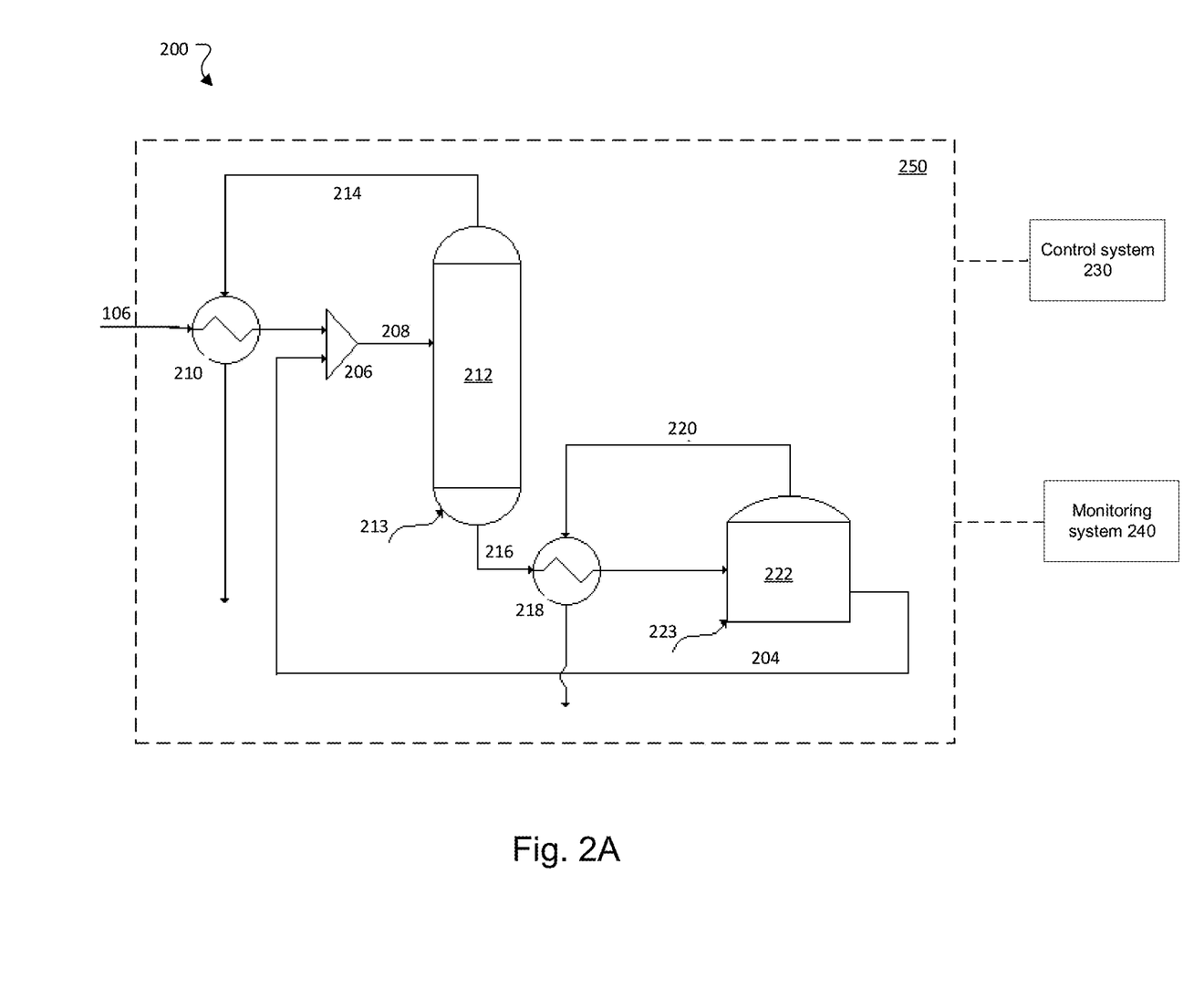
FIGS. 2A and 2B are diagrams of on-board fuel separation systems.

FIG. 2A is a diagram of an example on-board fuel separation system 200 that separates the fuel stream 106 into multiple fractions, each fraction containing fuel having a different auto-ignition characteristic value (for example, different RON or cetane number). To achieve the separation, a solvent that has an affinity for components of the fuel stream 106 that have a particular characteristic (for example, high RON fuel or low RON fuel) is added to the fuel stream 106. The addition of the solvent increases the difference in volatility between components of the fuel, such as between high RON and low RON components. In particular, the addition of the solvent to the fuel stream 106 shifts (for instance, increases or decreases) the volatility of those components of the fuel stream 106 to which the solvent has an affinity. Those components can then be separated from the rest of the fuel stream by extractive distillation based on the difference in volatility between those components and the other components in the fuel stream.

The on-board fuel separation system 200 includes a fuel separation sub-assembly 250 (designated by the dashed line). The fuel stream 106 received into the fuel separation sub-assembly 250 is heated at a heat exchanger 210. The heat exchanger 202 can be a plate and frame heat exchanger, a shell and tube heat exchanger, a fin and tube heat exchanger, or another type of heat exchanger. The fuel stream 106 is heated at the heat exchanger 210 by exchange with a first fuel fraction 214 that is output as from a fuel separator 212, discussed in the following paragraphs. The heat exchanger 210 uses the vapor in the first fuel fraction 214 as a heat source to heat the fuel stream 106 to a temperature that is slightly below the temperature of the first fuel fraction 214, such as within about 5° C. or within about 10° C. the temperature of the first fuel fraction 214. In some examples, an additional heating component can be present in addition to the heat exchanger 210, such as an electric heating unit, heating tape, or another type of heating component. The additional heating component can be used, for instance, in "cold start" situations in which the vehicle is being started. For instance, in a cold start situation, the first fuel fraction 214 may not initially be hot enough to provide sufficient heat to the heat exchanger 210 for heating the fuel stream 108. In this situation, the additional heating component can be used until the first fuel fraction 214 reaches a sufficiently high temperature.

The heated fuel stream 106 output from the heat exchanger 210 is mixed with a solvent in a mixer 206. In some examples, the solvent is a recycle stream 204 returned from a downstream component in the fuel separation sub-assembly 250. In some examples, the solvent is supplied from another source, such as a storage tank. The volume ratio of solvent to fuel in the mixture can be, for instance, between about 0.1 and about 0.3, such as 0.1, 0.15, 0.2, 0.25, 0.3, or another value. The solvent has a high affinity to certain components in the fuel stream 106, such as components with high auto-ignition characteristic values or components with low auto-ignition characteristic values. Example solvents can include triethylene glycol, propylene carbonate, phenol, or tetraethylene glycol.

A mixed stream 208 of fuel and solvent is output from the mixer 206 and fed into the fuel separator 212, such as a distillation column or a flash tank. The fuel separator 212 separates the mixed stream 208 of fuel and solvent into two fraction streams: the first fuel fraction 214, which is output as a vapor stream, and a mixed fraction 216 including fuel and the solvent, which is output as a liquid stream. The fuel in the first fuel fraction 214 has a different auto-ignition characteristic value than the fuel in the mixed fraction 216. For instance, the fuel in the first fuel fraction 214 can have an auto-ignition characteristic value that is higher than the fuel in the mixed fraction 216, or the fuel in the first fuel fraction 214 can have an auto-ignition characteristic that is lower than the fuel in the mixed fraction.

In some examples, the flow rate or pressure of the mixed stream 208 into the fuel separator 212 can be controlled by an orifice, such as a valve, a fixed orifice, a variable orifice, or another flow control device, for instance, to obtain fuel of a desired auto-ignition characteristic value in the first fuel fraction 214 and the second fuel fraction 220. For instance, the flow rate of the mixed stream 208 can be between about 1 Liter per hour (L/h) and about 50 L/h.

The fuel separator 212 can be operated at a temperature of between about 70° C. and about 200° C., such as about 70° C., about 90° C., about 100° C., about 120° C., about 140° C., about 160° C., about 180° C., about 200° C., or another temperature. The temperature of the fuel separator 212 can be a temperature sufficient to obtain fuel of a desired auto-ignition characteristic value in the first fuel fraction 214 and a second fuel fraction 220 (described in the following paragraphs). An additional heat source 213, such as exhaust gas or hot coolant, can deliver heat directly to the fuel separator 212 to bring the fuel separator 212 to the desired temperature.

In some examples, the fuel separator 212 is operated at ambient pressure, such as about 1 bar. In some examples, the fuel separator 212 is operated under vacuum (for instance, at a pressure lower than ambient pressure) in order to recover increased high volatility components in the mixed stream 208. For instance, the fuel separator 212 can be operated between about 0.1 bar and about 1 bar, such as about 0.1 bar, about 0.2 Bar, about 0.3 bar, about 0.4 bar, about 0.5 Bar, about 0.6 bar, about 0.7 bar, about 0.8 bar, about 0.9 bar, about 1.0 bar, or another pressure. In some examples, the fuel separator 212 can be operated at pressures significantly above ambient pressure to achieve desired stream conditions or fuel qualities. For instance, the fuel separator 212 can be operated at a pressure of up to about 10 bar, such as about 2 bar, about 4 bar, about 6 bar, about 8 bar, about 10 bar, or another pressure.

The fuel separator 212 can be a flash distillation assembly that separates the mixed stream 208 of fuel and solvent into at least two separate fractions (for instance, the first fuel fraction 214 and the mixed fraction 216) based on a relative volatility of the fractional components in the mixed stream. In particular, the solvent in the mixed stream 108 has an affinity for certain components in the fuel in the mixed stream. The affinity of the solvent for these components causes the volatility of these components to shift. In an example, the presence of the solvent can reduce the volatility of low RON components in the fuel. When the mixed stream 208 is distilled in the fuel separator 212, the reduced volatility of the low RON components prevents these components from evaporating. These low volatility low RON components along with the solvent remain liquid and form the mixed fraction 216. The components of the fuel for which the solvent does not have an affinity (for instance, the higher RON components) are not affected. These higher RON components thus have a higher volatility than the low RON components, and are evaporated to form the first fuel fraction 214.

In some examples, the flash distillation assembly can include one or more flash tanks that are fitted with screens or similar internal structures to prevent or reduce liquid droplets (mist) from being carried with the first fuel fraction 214. In some examples, the flash distillation assembly can be a compact distillation unit filled with structured or random packing or with trays, to improve the separation and prevent or reduce mist carryover into the first fuel fraction 214. In some examples, a number of flash tanks in the flash distillation assembly can be determined by, for example, components of the fuel stream 106 (for example, linear alkanes, branched alkanes, cyclic alkanes, alkenes, aromatics) and their relative volatility, the volatility of additives of the fuel stream 106 such as oxygenates, the desired auto-ignition characteristic value of the first fuel fraction 214 and the fuel in the mixed fraction 216, relative flow rates of the first fuel fraction 214 and the mixed fraction 216, or other features, or a combination thereof. Although two output streams (for example, the first fuel fraction 214 and the mixed fraction 216) are shown from the fuel separator 212, more than two output streams (for example, based on a number of fuel separation stages, flash tanks, or otherwise) can be output from the fuel separator 212.

The first fuel fraction 214, which contains substantially only fuel, is condensed into a liquid by exchange with the fuel stream 108 in the heat exchanger 210. The condensed first fuel fraction 214 can be stored in a fractional fuel tank or a standard vehicle fuel tank or can be circulated to the engine in real-time. The mixed fraction 216, which contains fuel and solvent, is heated in a heat exchanger 218 by exchange with a second fuel fraction 220 that is output from a recovery unit 222. The heat exchanger 218 can heat the mixed fraction 216 to a temperature that is slightly below the temperature of the second fuel fraction 220, such as within about 5° C. or within about 10° C. of the temperature of the second fuel fraction 220. In some examples, an additional heating component can be present in addition to the heat exchanger 218, such as an electric heating unit, heating tape, or another type of heating component. The additional heating component can be used, for instance, in "cold start" situations in which the vehicle is being started. For instance, in a cold start situation, the second fuel fraction 220 may not initially be hot enough to provide sufficient heat to the heat exchanger 218 for heating the mixed fraction 216. In this situation, the additional heating component can be used until the second fuel fraction 220 reaches a sufficiently high temperature.

The heated mixed fraction 216 is fed into the recovery unit 222, such as a flash tank, a membrane, an adsorption-based separator, or another type of recovery unit. The recovery unit 222 separates the solvent in the mixed fraction 216 from the fuel. The separated fuel is output as the second fuel fraction 220. The solvent can be returned to the mixer 206 as the recycle stream 204 to be reused for further separation or can be stored or discarded.

In some examples, the flow rate or pressure of the mixed fraction 216 into the recovery unit 222 can be controlled by an orifice, such as a valve, a fixed orifice, a variable orifice, or another flow control device. For instance, the flow rate of the mixed fraction 216 can be between about 0.5 L/h and about 20 L/h.

The recovery unit 222 can be operated at a temperature of between about 110° C. and about 280° C., such as about 110° C., about 130° C., about 150° C., about 160° C., about 180° C., about 200° C., about 220° C., about 240° C., about 260° C., about 280° C., or another temperature. In some examples, an additional heat source 223, such as exhaust gas, can heat the recovery unit 222 to the desired temperature.

In some examples, the recovery unit 222 is operated at ambient pressure, such as about 1 Bar. In some examples, the operating characteristic of the engine comprises one or more of an engine load, an engine torque, and engine speed, a fuel vapor-liquid ratio, a fuel vapor lock index, a fuel drivability index, a fuel T90 or T95 property, a fuel lubricity, a fuel viscosity, and an engine speed-torque ratio, the recovery unit 222 is operated under vacuum (for instance, at a pressure lower than ambient pressure) in order to recover increased high volatility components in the mixed stream 208. For instance, the recovery unit 222 can be operated between about 0.1 Bar and about 1 Bar, such as about 0.1

Bar, about 0.2 Bar, about 0.3 Bar, about 0.4 Bar, about 0.5 Bar, about 0.6 Bar, about 0.7 Bar, about 0.8 Bar, about 0.9 Bar, about 1.0 Bar, or another pressure. In some examples, the recovery unit 222 can be operated at pressures significantly above ambient pressure to achieve desired stream conditions or fuel qualities. For instance, the recovery unit 222 can be operated at a pressure of up to about 10 bar, such as about 2 bar, about 4 bar, about 6 bar, about 8 bar, about 10 bar, or another pressure.

Figure 2B:
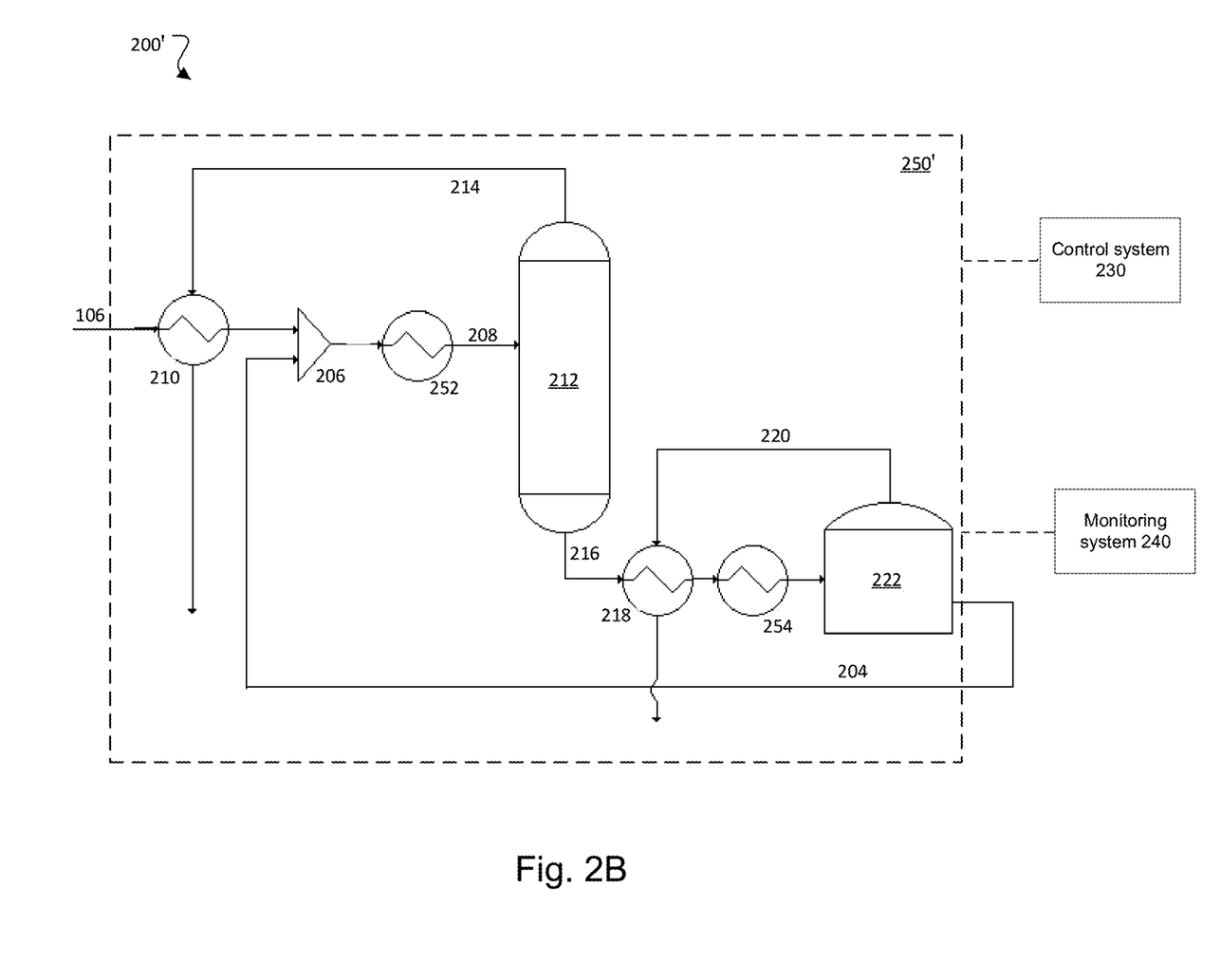

Referring to FIG. 2B, an example on-board fuel separation system 200' includes a fuel separation sub-assembly 250' that separates the fuel stream 106 into multiple fractions, each fraction containing fuel having a different auto-ignition characteristic value (for example, different RON or cetane number). In the fuel separation sub-assembly 250', the fuel stream 106 is heated at the heat exchanger 210 as described in the preceding paragraphs in conjunction with FIG. 2A. The heated fuel stream 106 output from the heat exchanger 210 is mixed with a solvent in the mixer 206.

The mixed stream 208 output from the mixer 206 is heated in another heat exchanger 252 by exchange with an on-board heat source, such as exhaust gas or hot coolant. The heat exchanger 252 heats the mixed stream 208 to a temperature higher than the temperature at which the fuel separator 212 is operated, because vaporization of the mixed stream 206 in the fuel separator 212 causes cooling of the mixed stream.

The fuel separator separates the mixed stream 206 into the first fuel fraction 214 and the mixed fraction 216, as described in the preceding paragraphs. The mixed fraction 216 is heated in the heat exchanger 218 by exchange with the second fuel fraction 220 output from the recovery unit 222. The mixed fraction 216 output from the heat exchanger 218 is then further heated in another heat exchanger 254 by exchange with an on-board heat source, such as exhaust gas or hot coolant. The heat exchanger 254 heats the mixed fraction 216 to a temperature higher than the temperature at which the recovery unit 222 is operated, because vaporization of the mixed fraction 216 in the recovery unit 222 causes cooling of the mixed fraction.

The heated mixed fraction 216 is fed into the recovery unit 222, which separates the mixed fraction 216 into a fuel fraction and solvent, as described in the preceding paragraphs.

In some examples, such as the example of FIGS. 2A and 2B, the solvent has a higher boiling point than the fuel in the mixed fraction 216. For instance, a solvent with a high boiling point can be used for fuels such as gasoline and naphtha. In these examples, the recovery unit 222 is operated at a temperature below the boiling point of the solvent and above the boiling point of the fuel. The solvent is thus output as a liquid and the fuel is output as a vapor that forms the second fuel fraction 220. The second fuel fraction 220 can be used to heat the mixed fraction 216 in the heat exchanger 218, and can be condensed into a liquid by exchange with the mixed fraction 216 in the heat exchanger 218. The liquid second fuel fraction 220 can be stored in a fractional fuel tank or a standard vehicle fuel tank or can be circulated to the engine in real time.

In some examples, the solvent has a lower boiling point than the fuel in the mixed fraction 216. For instance, a solvent with a low boiling point can be used for fuels such as diesel and middle distillates. In these examples, the recovery unit is operated at a temperature above the boiling point of the solvent and below the boiling point of the fuel. The fuel is thus output as a liquid that forms the second fuel fraction 220 and the solvent is output as a vapor. In some cases, the evaporated solvent can be condensed into a liquid by exchange with the mixed fraction 216 in the heat exchanger 218. In some cases, the evaporated solvent can be condensed into a liquid in another component.

In some examples, solvent loss can occur during operation of the on-board fuel separation system, and the solvent can be selected to avoid detrimental effects to the engine or to the environment. For example, a solvent that does not contain sulfur or nitrogen can be used. In some examples, the solvent can contain oxygen to increase the auto-ignition characteristic value of the fuel. In some examples, the solvent can be selected to improve fuel lubricity, viscosity, or both, such as for fuels for diesel engines. In some examples, the solvent can be miscible with the fuel; in some examples, the solvent can be immiscible with the fuel.

In a specific example, triethylene glycol can be used as a solvent for gasoline separation. Triethylene glycol has an affinity for high RON components of gasoline, such as methyl tert-butyl ether (MTBE), and has a higher boiling point than the gasoline. Addition of triethylene glycol to the fuel stream reduces the volatility of the high RON components of the fuel. Accordingly, the low RON components are separated from the solvent-fuel mixture in the fuel separator 212 and form the first fuel fraction, and the high RON components are removed from the solvent as vapor in the recovery unit 222.

More generally, in some examples, a solvent can be used that has a high boiling point and high polarity, such that the solvent can alter the volatility of aromatic molecules in diesel fuel, thus separating the aromatic molecules from other diesel components to produce cetane on demand.

In some examples, the effect of a particular solvent on the volatility on certain components of a fuel can be determined by calculating the activity coefficient of each component with and without the solvent. The activity coefficient for a component (or for the component with the solvent) can be calculated based on the equilibrium conditions of the component within the mixture. If the ratio of the activity coefficient for a component with the solvent to the activity coefficient for the component without the solvent is greater than one, the volatility of the component is enhanced by addition of the solvent. If the same ratio is less than one, the volatility of the component is reduced by addition of the solvent.

The on-board fuel separation system 200 includes a control system 230 that is communicably coupled to the fuel separation sub-assembly 250. The control system 230 can be a mechanical, pneumatic, electro-mechanical, or microprocessor based control system, or another type of control system, or a combination thereof. The control system 230 can receive inputs associated with engine operating characteristics of an engine of a vehicle that includes the on-board fuel separation system. Example engine operating characteristics include, for example, engine load, engine torque, engine speed, and fuel specifications such as vapor-liquid ratio, a vapor lock index, a drivability index, a T90 or T95 property, a fuel lubricity, a fuel viscosity, or an engine speed-torque ratio, among other examples.

Based on the engine operating characteristics, the control system 230 can determine the type of fuel to be sent to the engine, such as the amount of high or low RON fuel and the associated RON value for the fuel. For instance, at high load, high octane (for example, long ignition delay) fuel is appropriate for a gasoline engine to avoid knocking and engine damage. In some examples, the control system 230 can have an estimate of the appropriate amount of high or low RON fuel (and associated RON value) for the engine, for instance, based on factors such as a factory setting, a driving history, or both, or other factors. In some examples, the control system 230 can have predictive capabilities that specify an amount of high or low RON fuel or specific RON values for certain engine operating characteristics.

The operating characteristics of the fuel separation sub-assembly 250 can impact the auto-ignition characteristics of the fuel in the first and second fuel fractions 214, 220. The control system 230 can send control signals to the fuel separation sub-assembly 250 to cause one or more operating characteristics of the fuel separation sub-assembly to be adjusted to obtain the appropriate type of fuel for a given set of engine operating characteristics. Examples of operating characteristics that can be adjusted to affect the auto-ignition characteristics of the fuel in the first and second fuel fractions 214, 220 can include, for instance, operating pressure, temperature, or both of one or more of the fuel separator 212, the recovery unit 222, and the temperature to which each heat exchanger 202, 210, 218 heats its respective stream 108, 208, 216. Other examples of operating characteristics that can be adjusted to affect the auto-ignition characteristics of the fuel in the first and second fuel fractions 214, 220 can include, for instance, flow rates, pressure, and temperature of one or more of the fuel streams 106, 214, 220, which can be adjusted by controlling the operation of an orifice, such as the valve 213, a fixed orifice, or a variable orifice. In some examples, such as when the fuel separator 212 includes a compact distillation unit, operating conditions that can be adjusted to affect the auto-ignition characteristics of the fuel in the first and second fuel fractions 214, 220 can include, for instance, the temperature of a reboiler, the temperature of a condenser, the number of equilibrium stages in the distillation unit, the reflux ratio, the amount of condensate drawn from the condenser, or other characteristics.

In a specific example, increasing the temperature of the fuel separator 212 at constant pressure increases the RON of the fuel in the first fuel fraction but decreases the flow rate of the first fuel fraction. Conversely, decreasing the temperature of the fuel separator decreases the RON of the fuel in the first fuel fraction but increases the flow rate of the first fuel fraction.

In some examples, the control system 230 can control other aspects of the operation of the fuel separation sub-assembly 250. For instance, the control system 230 can control an orifice, such as a valve, a fixed orifice, or a variable orifice (not shown) in the conduit for the mixed fraction 216 so that a minimum level of liquid can be allowed to remain in the fuel separator 212, thus helping to keep vapor from entering into the mixed fraction 216.

In some examples, the control system 230 can monitor the properties of the fuel in the first and second fuel fractions 214, 220, such as cold start, vapor-liquid ratio, vapor lock index, drivability index, lubricity, viscosity, or other properties. If a property of the fuel in the first or second fuel fraction 214, 220 changes beyond a threshold, the control system 230 can adjust the operating characteristics of the fuel separation sub-assembly 250 or can cause fuel additives to be introduced into the fuel fraction to maintain the property within the threshold, such as corrosion inhibitors, antiknock agents, oxygenates, antioxidants, detergents, lubricity enhancers, or other types of additives.

In some examples, the first fuel fraction 214, the second fuel fraction 220, or both are not completely condensed to a liquid in the respective heat exchanger 210, 218. In these examples, the partially condensed fuel fraction 214, 220 can be further cooled to more completely condense any remaining vapor in the fuel fraction 214, 220. In some cases, the vapor in the partially condensed fuel fraction 214, 220 can be separated and circulated to the engine with an air intake to the engine. In some cases, a secondary heat exchanger (not shown), such as a cooling coil, radiator, or otherwise, may further cool the fuel fraction 214, 220, for example, with a cold refrigerant that is part of the vehicle air-conditioning system. In some cases, a pressure of the partially condensed fuel fraction 214, 220 can be increased to further condense the fuel fraction 214, 220.

In some examples, a monitoring system 240 can monitor the amount of solvent lost during operation of the fuel separation sub-assembly 250. For instance, the monitoring system can measure the flow rate of the recycle stream 204, the first fuel fraction 214, or both. If the flow rate of either stream declines below a corresponding threshold value, additional solvent can be introduced into the recycle stream 204 to compensate for the solvent losses.

In some examples, one or more of the heat exchangers 210, 218, 252, 254 can be eliminated from the fuel separation sub-assembly. However, the removal of a heat exchanger can impose greater heating requirements on the fuel separator 212, the recovery unit 222, or both. In some examples, the fuel separator 212, the recovery unit 222, or both can operate at reduced pressure, such as a pressure below ambient pressure, to reduce heating requirements. In some examples, one or more of the heat exchangers 210, 218, 252, 254 can provide heating at least in part by exchange with waste heat from exhaust gas or hot coolant from the vehicle, thus reducing energy waste from operation of the vehicle.

In some examples, one or more of the fuel fractions can be stored in the fuel separator 212, the recovery unit 222, or both, for instance, when the vehicle is in an idle condition.

Figure 3:
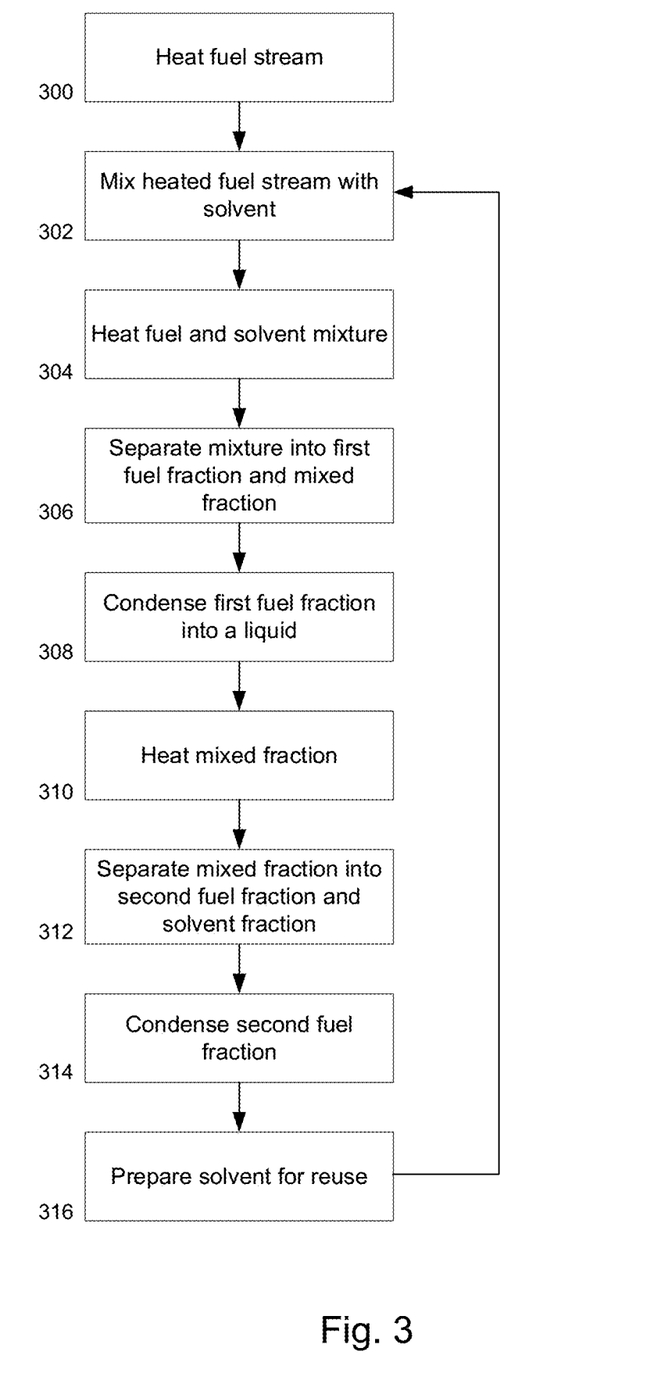
FIG. 3 is a flow chart.

Referring to FIG. 3, in an example process for on-board fuel separation, a fuel stream is heated in a heat exchanger or other type of heating component (300). The heated fuel stream is mixed with a solvent (302) and heated further (304). The further heating (304) can be in a heat exchanger (for instance, as shown in FIG. 2B) or by introducing of heat directly into a fuel separator (for instance, as shown in FIG. 2A). The solvent has an affinity for certain components of the fuel stream, and causes the volatility of those components to be increased or decreased relative to the volatility of the remaining components in the fuel stream.

The mixture of fuel and solvent is separated in a fuel separator into a first fuel fraction and a mixed fraction (306). The mixed fraction contains fuel and the solvent. The fuel in the first fuel fraction has a different auto-ignition characteristic value than the fuel in the mixed fraction. For instance, the fuel in the first fuel fraction can have an auto-ignition characteristic value that is higher than the fuel in the mixed fraction. The first fuel fraction is condensed to a liquid (308) and stored in a fractional fuel tank or a standard vehicle fuel tank or circulated directly to the engine.

The mixed fraction is heated (310) and separated in a recovery unit into a second fuel fraction and a solvent (312). The second fuel fraction is condensed to a liquid (314) and stored in a fractional fuel tank or a standard vehicle fuel tank or circulated directly to the engine. The solvent is prepared for reuse (316), for instance, for mixing with an incoming fuel stream (302), or stored or discarded.

Example—Separation of Fuel

The on-board fuel separation system shown in FIG. 2A was operated to process 95 RON Saudi Arabian gasoline with a flow rate of 10 Liters/hour at ambient conditions (1 bar and 23° C.). Triethylene glycol was used as the solvent. The flow rate of the solvent ranged from 10-25 vol. % of the flow rate of the gasoline. A single flash tank was used as each of the fuel separator and the recovery unit. The RON characteristics of the first and second fuel fractions were measured as a function of the operating temperature of the fuel separator (212 in FIGS. 2A and 2B). The solvent losses were also measured.

Figure 4:
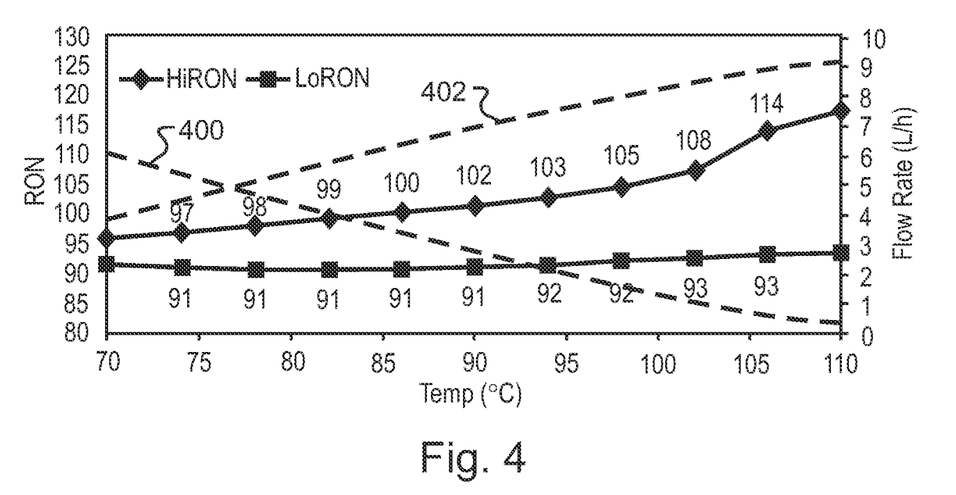
FIGS. 4-6 are graphs depicting results of operating an on-board fuel separation system.

Referring to FIG. 4, the RON (left axis) and flow rate (right axis) of the first fuel fraction ("HiRON") and the second fuel fraction ("LoRON") were measured as a function of the temperature of the fuel separator. The flow rate of the first fuel fraction is shown as a line 400 and the flow rate of the second fuel fraction is shown as a line 402. The temperature of the fuel separator was maintained at 102° C. and the temperature of the recovery unit was maintained at 160° C. Both the fuel separator and the recovery unit were operated at ambient pressure. The RON of the first and second fuel fractions were estimated by volumetric blending of gasoline components. These results demonstrate that increasing the temperature of the fuel separator can increase the RON of the first fuel fraction but at the cost of a lower flow rate for the first fuel fraction. Conversely, operating the fuel separator at a lower temperature achieves a higher flow rate but a lower RON for the first fuel fraction. In this example, the RON of the second fuel fraction is substantially independent of the temperature of the fuel separator, and the effect of the temperature of the fuel separator on the flow rate of the second fuel fraction is generally opposite to the effect on the first fuel fraction.

Figure 5:
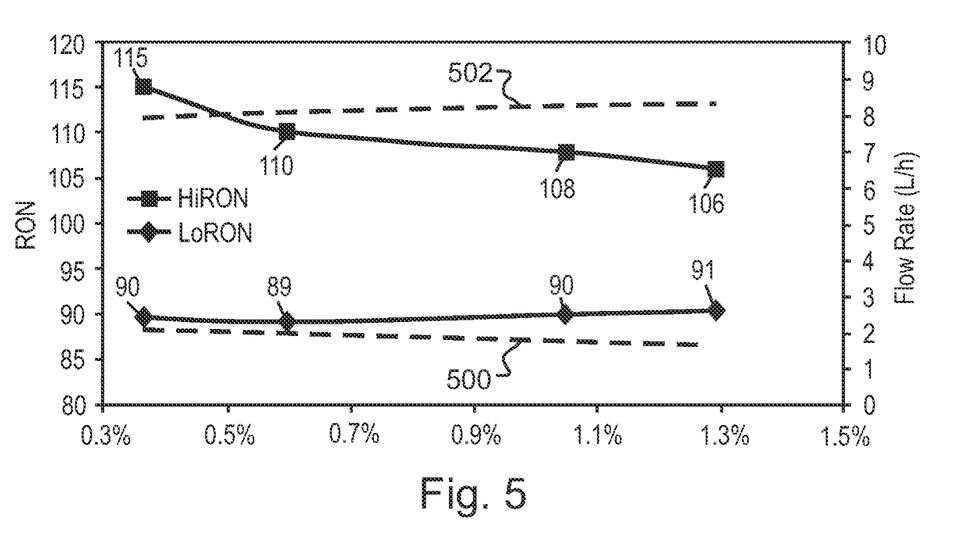

Referring to FIG. 5, the RON (left axis) and flow rate (right axis) of the first and second fuel fractions are plotted against the solvent loss during the separation process. The flow rate of the first fuel fraction is shown as a line 500 and the flow rate of the second fuel fraction is shown as a line 502. Solvent loss was measured by determining the ratio of the solvent in the first and second fuel fractions to the solvent in the recycle stream. These results show a generally low amount of solvent loss during the separation process, indicating that the first and second fuel fractions contain substantially only fuel. These results also indicate that a smaller solvent loss occurs when the first fuel fraction contains higher RON fuel.

Figure 6:
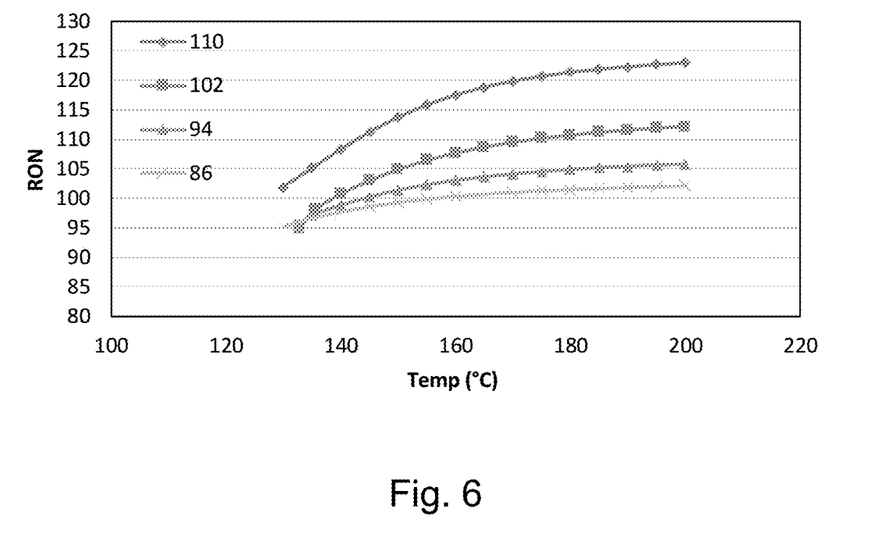

Referring to FIG. 6, the RON is plotted against the temperature of the recovery unit for various temperatures of the fuel separator. These results show that higher temperatures in both the recovery unit and the fuel separator result in higher RON fuel.

Other implementations are also within the scope of the following claims.

What is claimed is:

1. A method comprising:
   in a mixer, mixing a fuel stream with a solvent to form a mixed stream, the solvent having a higher affinity for a second component of the fuel stream than for a first component of the fuel stream;
   in a first separator downstream from the mixer, separating the mixed stream into a first fuel fraction including the first component of the fuel stream and a mixed fraction including the second component of the fuel stream based on a difference in volatility of the first fuel fraction and the mixed fraction;
   in a second separator downstream from the first separator and in fluid communication with the mixer, separating the mixed fraction into a second fuel fraction including the second component of the fuel stream and a solvent fraction;
   in a heat exchanger, transferring heat from the second fuel fraction to the mixed fraction, thereby condensing the second fuel fraction and pre-heating the mixed fraction upstream of the second separator; and
   recycling the solvent fraction from the second separator to the mixer to mix with the fuel stream to form the mixed stream.

2. The method of claim 1, in which the first fuel fraction has a different auto-ignition characteristic value than the second fuel fraction.

3. The method of claim 1, in which mixing the fuel stream with a solvent comprises mixing the fuel stream with the solvent fraction.

4. The method of claim 1, comprising separating the mixed stream on-board a vehicle during operation of the vehicle.

5. The method of claim 1, comprising heating the mixed stream; and
   in which separating the mixed stream comprises separating the heated mixed stream.

6. The method of claim 5, in which heating the mixed stream comprises heating the mixed stream by exchange with the first fuel fraction.

7. The method of claim 1, comprising controlling the separating of one or more of the mixed stream and the mixed fraction based on an operating characteristic of an engine of a vehicle.

8. The method of claim 7, in which the operating characteristic of the engine comprises one or more of an engine load, an engine torque, and engine speed, a fuel vapor-liquid ratio, a fuel vapor lock index, a fuel drivability index, a fuel T90 or T95 property, a fuel lubricity, a fuel viscosity, and an engine speed-torque ratio.

9. The method of claim 7, in which controlling the separating of one or more of the mixed stream and the mixed fraction comprises controlling the separating to provide fuel with a target auto-ignition characteristic value to the engine.

10. The method of claim 7, in which controlling the separating of one or more of the mixed stream and the mixed fraction comprises controlling a flow rate of one or more of the mixed stream and the mixed fraction.

11. The method of claim 7, in which controlling the separating of one or more of the mixed stream and the mixed fraction comprises controlling a temperature or a pressure of the separating.

12. The method of claim 1, comprising storing one or more of the first fuel fraction and the second fuel fraction in a corresponding fuel tank housed on a vehicle.

13. The method of claim 1, comprising providing one or more of the first fuel fraction and the second fuel fraction to an engine of a vehicle.

14. The method of claim 1, comprising storing one or more of the first fuel fraction and the second fuel fraction in a separation tank.

* * * * *